Nov. 23, 1971 R. K. CLARK 3,621,720
IDENTIFICATION SYSTEM
Filed Jan. 27, 1969 3 Sheets-Sheet 1

INVENTOR.
Robert K. Clark
BY
Wood, Herron & Evans
ATTORNEYS

Nov. 23, 1971 R. K. CLARK 3,621,720
IDENTIFICATION SYSTEM
Filed Jan. 27, 1969 3 Sheets-Sheet 2
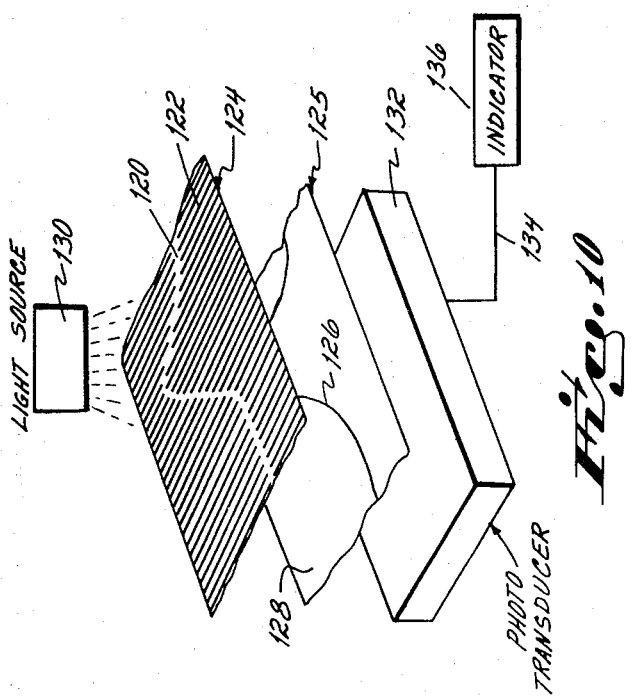
Fig. 10
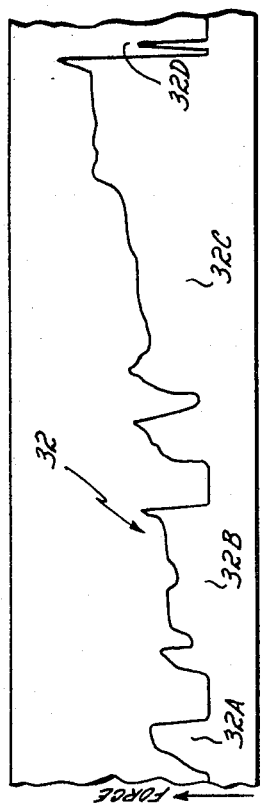
Fig. 2
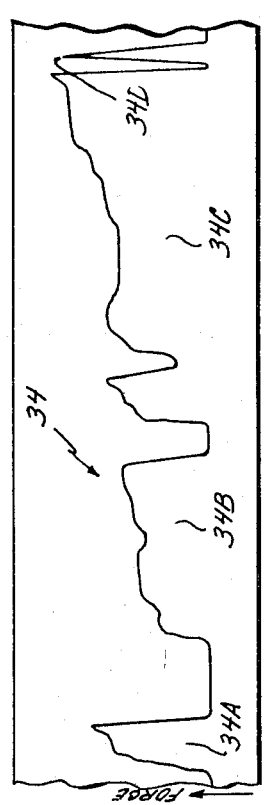
Fig. 3
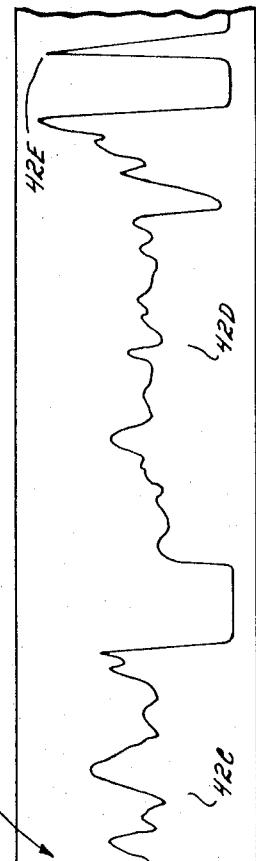
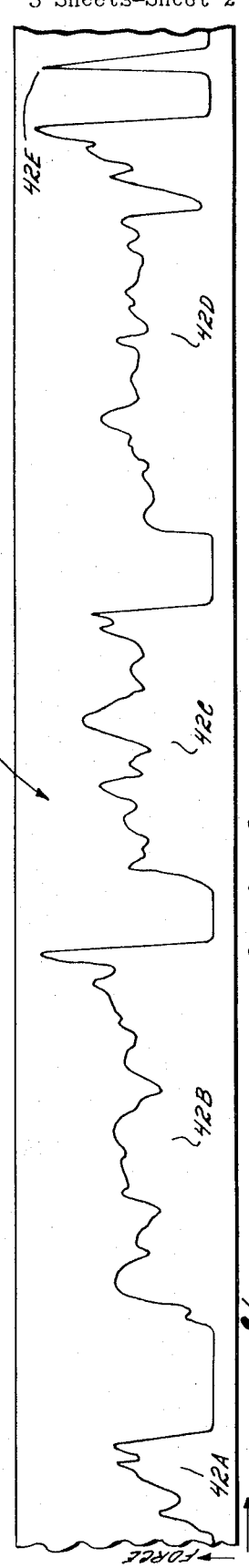
Fig. 6

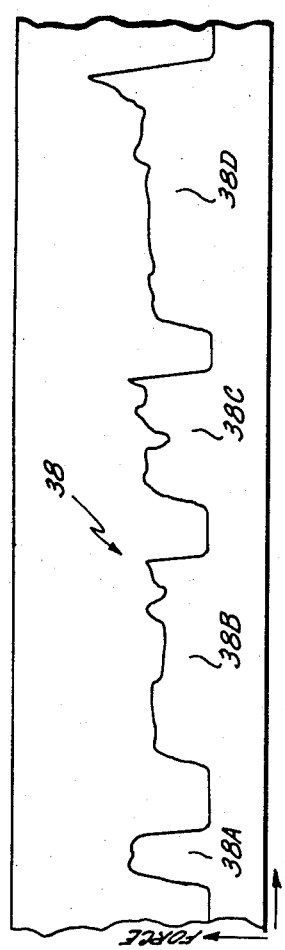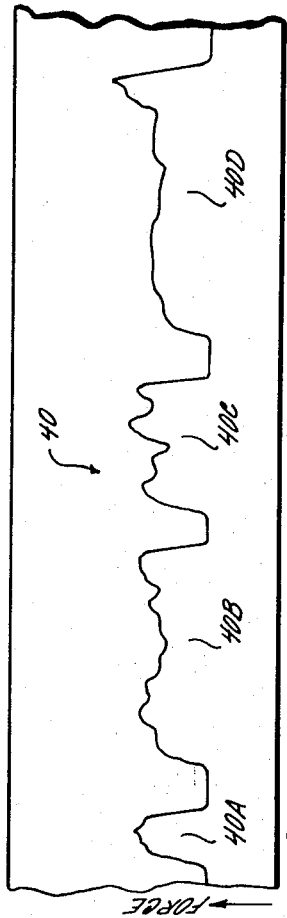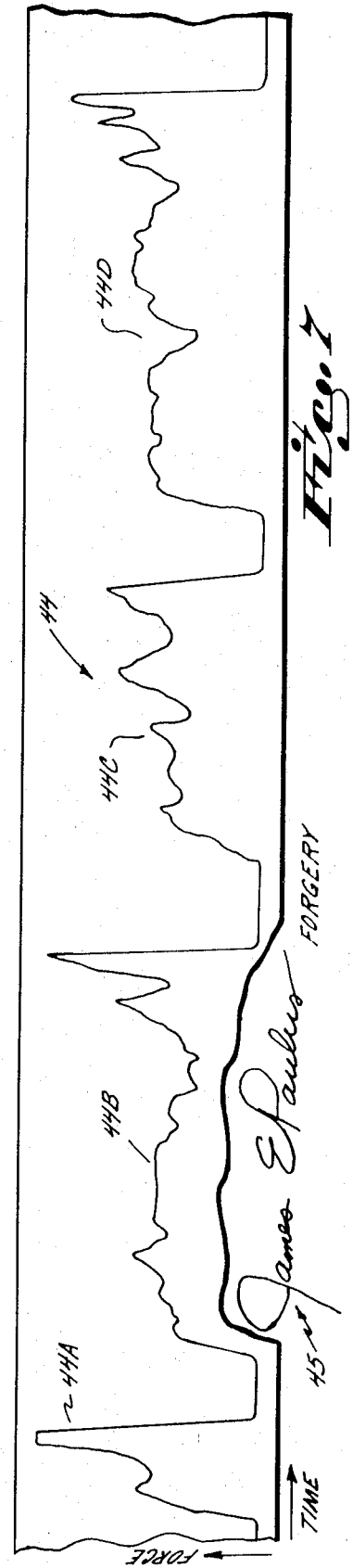

United States Patent Office 3,621,720
Patented Nov. 23, 1971

3,621,720
IDENTIFICATION SYSTEM
Robert Kenley Clark, Forest Park, Cincinnati, Ohio, assignor to The Mosler Safe Company, Cincinnati, Ohio
Filed Jan. 27, 1969, Ser. No. 793,961
Int. Cl. G01l 5/00
U.S. Cl. 73—432
1 Claim

ABSTRACT OF THE DISCLOSURE

A system for verifying the identity of a person wherein verification is established by a favorable comparison between (a) the time-varying force between a writing instrument and writing surface produced when the person to be identified writes his signature and (b) stored data correlated to the time-varying force previously generated by a person of known identity while writing his signature.

---

This invention relates to the identification of persons of unknown identity, and more particularly to the identification of such persons by virtue of analyzing variations in a certain variable characteristic of the signature writing process.

With the increasing reliance on credit in business transactions of all types, the need for a commercially feasible system for verifying the identity of persons is becoming more acute. The methods currently in use, such as comparing a person's signature or physical appearance with that on an identification card, have left much to be desired. Where signature comparison is employed, which is by far the most prevalent method of identification, even an unsophisticated forger can produce a signature which, to the untrained eye of a normal department store clerk or gas station attendant, is sufficiently similar to the genuine signature as to constitute a passable forgery. When credit is extended by a commercial institution on the basis of such a forgery, the commercial institution and/or the customer whose signature is forged must bear the loss unless, of course, the forger is apprehended. Even when the forger is apprehended, the likelihood of which at best is problematical, the victim of the forgery is put to needless expense and bother. Accordingly, reliance on signature comparison at the time of the credit transaction has proven to be a less than totally reliable system for personal identification.

A proposed variant of the foregoing signature comparison approach involves measuring the total force exerted on the pen by a person when signing his name, as well as the direction of the force and the time duration necessary for signing. These measurements are then used for identification purposes. While some might expect such an approach to be workable, it is not believed known to ever have been made operable, and in any event requires the measurement of three separate characteristics of the writing process, namely, total force, direction, and time.

To overcome the problems associated with conventional signature verification and identification techniques as known in the commercial field today, a number of systems predicated on different identification concepts, that is, concepts not involving signatures, have been proposed for use in the consumer credit area. Among the most popular is the proposal to use, as a basis for distinguishing people one from another, a person's fingerprint. Fingerprints, while providing a highly accurate and reliable basis for personal identification, have not been found suitable for use in the consumer credit field because of the general reluctance of people to be fingerprinted. Fingerprinting offends the sensibilities of potential customers and therefore commercial institutions are loathe to use it. Additionally, fingerprinting is messy in that it normally requires a person's finger to be inked, which ink must be removed by appropriate cleaning techniques.

Other techniques have been proposed for consumer identification, but are equally unsatisfactory. For example, it has been proposed to measure the dimensions of a person's ear, the electrical resistance of their skin, the characteristic smell or odor of their body, and the like. While such techniques may provide reliable means for identifying persons, it is apparent that they are not a commercially practical solution for the application in the consumer identification field.

Accordingly, it has been an objective of this invention to provide a method and apparatus for identifying a person in a commercial transaction which is simple, reliable, and yet does not offend the individual being identified. This objective has been accomplished in accordance with the principles of this invention by adopting a fundamentally different approach to the identification of personnel which is predicated on the novel and unobvious discovery that the time-varying change in a characteristic of the writing process, namely, the time-varying change in force between a pen and writing surface produced by a person at the time he signs his name, is both unique to the person signing, as well as reproducible from signature to signature. Thus, by comparing the force variation pattern of a person of unknown identity with the force variation pattern of a person of known identity, it is possible to verify the identity of the person heretofore unknown. This verification technique, wherein the time-varying force pattern is used, is to be clearly distinguished from a proposal heretofore made and earlier noted, wherein the total force expended during signing is used along with the direction of the force and the time duration for signing. In the former system, that is, the system of this invention, data correlated to the magnitude of the force at a multiplicity of points, in effect a set of force magnitude data, is utilized for comparison. This is in contrast to the use of data based solely on a single magnitude, namely, the magnitude of the total force which in effect is a single bit of force magnitude data.

In accordance with a preferred embodiment incorporating the foregoing principle of this invention, a writing instrument is provided equipped with a force transducer for producing a substantially continuous time-varying signal correlated to the varying force existing between the writing instrument and cooperating writing surface when the person to be identified writes his signature. The time-varying signal output from the transducer is, in accordance with this embodiment, compared with a stored representation of an authentic time-varying signal previously generated by a person of known identity while writing his signature. If the comparison is favorable the person seeking identification is deemed authentic. In accordance with one arrangement, the time-varying signal output from the force transducer, which is generated at the time of identification, is input to a strip-chart recorder for producing a visually perceptive trace representing a plot of the force versus time. This trace is then compared with a stored trace similarly generated by a person of known identity. Again, if the comparison is favorable, the person is deemed authentic.

This and other objectives and advantages of the invention will become more readily apparent from a detailed description of the invention taken in conjunction with the drawings in which:

FIGS. 2 and 3 are unique and substantially identical traces, each constituting a plot of force versus time, generated by the same person in the course of signing his name.

FIGS. 4 and 5 are unique and substantially identical traces, each constituting a plot of the force versus time, generated by another person in the course of signing his name.

FIGS. 6 and 7 are traces, each constituting a plot of force versus time, generated by a commercial artist in the course of tracing the signatures of the persons associated with the traces of FIGS. 4 and 5 and FIGS. 5 and 6, respectively.

Figure 8:
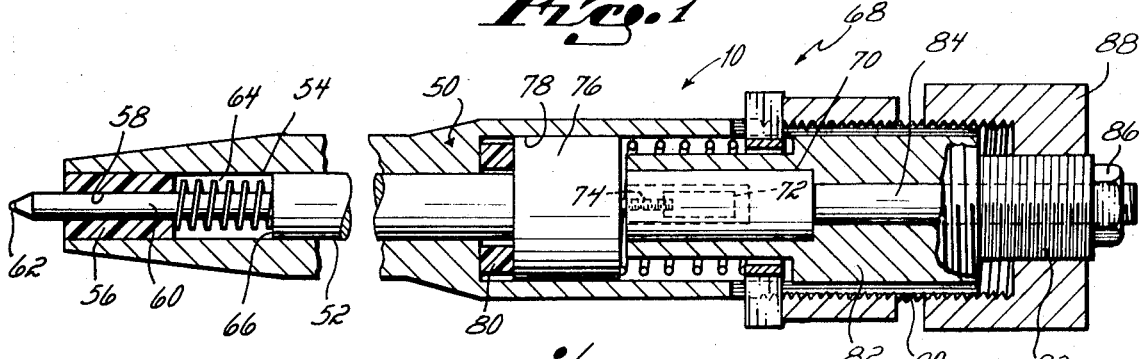

FIG. 8 is a cross section of a writing instrument equipped with a force transducer suitable for use in carrying out the principles of this invention.

Figure 1:
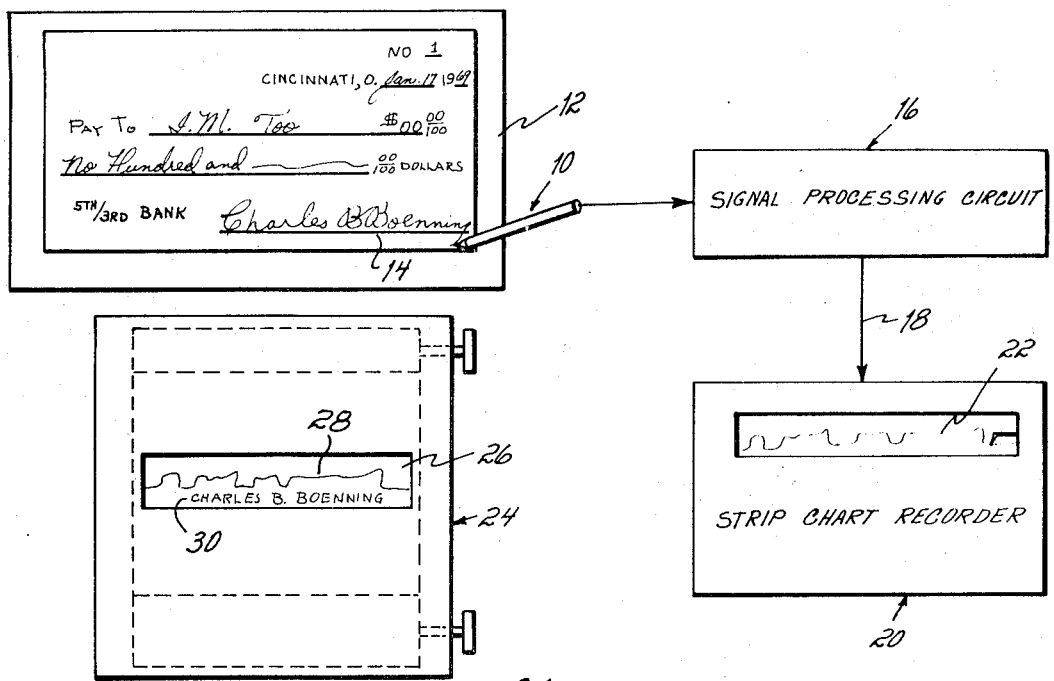
FIG. 1 is a schematic circuit diagram in block diagram format of a preferred embodiment of a personal identification system constructed in accordance with the principles of this invention.
Figure 9:
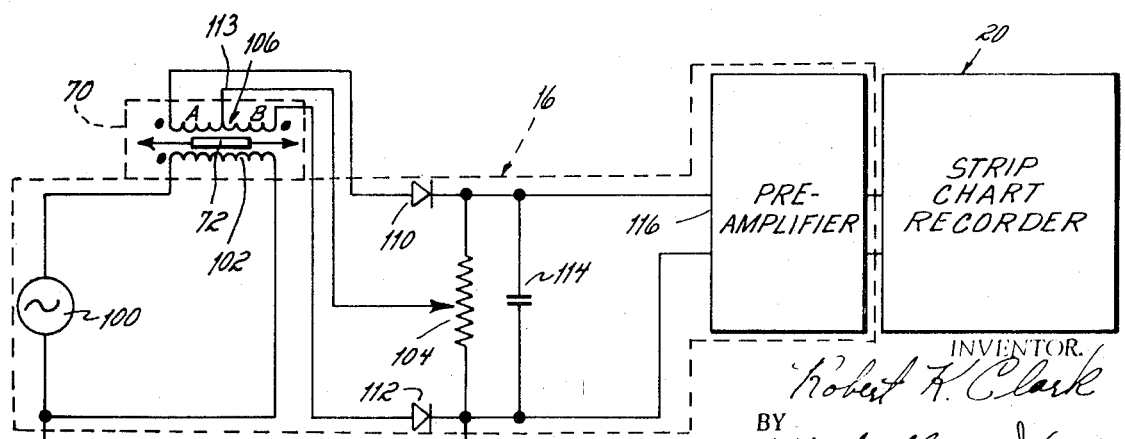

FIG. 9 is a schematic circuit diagram showing the electrical components of the system depicted in FIG. 1.

FIG. 10 is a perspective view of one possible optical comparison system for comparing a trace generated at the time of identification with an authentic stored trace previously generated by a person of known identity.

In accordance with a preferred embodiment depicted in FIG. 1, which incorporates certain of the principles of this invention, a cooperating writing instrument 10 and writing surface 12 are provided. Between the instrument 10 and the surface 12 a time-varying force exists when the person to be authenticated or identified writes a predetermined sequence of characters, for example, his signature 14, as an incident to a commercial transaction, such as, a consumer credit sale, check-cashing transaction or the like. Operatively associated with the writing instrument 10 and writing surface 12 is a signal processing circuit 16 adapted to provide on output line 18 a useful signal correlated to the magnitude at a plurality of points in time of the time-varying force between the writing instrument 10 and writing surface 12 existing by virtue of the signature writing process engaged in by the person to be authenticated. Preferably the signal on output line 18 provided by the signal processing circuit 16 is a continuous time-varying signal correlated to the magnitude, at all points in time, of the force between the writing instrument 10 and surface 12 produced as an incident of writing the signature 14.

Also included in the preferred embodiment of FIG. 1 is a first storage means, or strip-chart recorder 20, which in response to the signal input thereto on line 18 provides a first set of data correlated to the magnitude at a plurality of different points in time of the force between the writing instrument 10 and the surface 12 produced as an incident of the signature writing process. Preferably the first set of data 22 is in the form of a continuous visually perceptive trace constituting a plot versus time of the magnitude at all points in time of a force between the writing instrument 10 and surface 12 produced during the signature writing operation. Also included in the preferred embodiment is a second storage means 24 in which is stored a second and authentic set of data correlated to the magnitude, at a plurality of points in time, of the force between the writing instrument 10 and surface 12 produced by a person of known identity writing his signature.

In one form, the storage means 24 is a rotary file having a plurality of separate selectively retrievable cards 26 on which is stored a continuous visually perceptive trace 28 of the magnitude at all points in time of the force produced as an incident to the signature writing operation by a person of known identity. Also on the card 26, and associated with the trace 28 of force versus time, is a humanly intelligible indication 30 of the person of known identity whose trace appears on the card. Thus, the rotary file 24 includes a plurality of cards (only one of which is shown), each associated with a different person of known identity and each bearing the force versus time trace produced as an incident to the signature writing process of that person, as well as a humanly intelligible indication of the identity of the person.

As indicated previously, applicant's invention is predicated on the discovery that the force between a writing instrument and a writing surface incident to a person writing a sequence of characters, for example, his signature, varies with time in a reproducible manner unique to that person. Accordingly, by recording the variation of force with time produced by a person of known identity when writing a predetermined sequence of characters, and thereafter comparing it with the variation in force with time produced when a person of unknown identity seeks authentication, it is possible to readily and reliably ascertain whether the person of unknown identity seeking authentication is in fact the same person of known identity whose previously produced force versus time variation pattern is now recorded for comparison.

With reference to FIGS. 2 and 3, two traces 32 and 34 of force versus time are shown, each produced as an incident to the signature writing operation of one Charles B. Boenning and recorded using identical equipment. Comparison of the traces 32 and 34 readily reveal that, while there are certain minor differences in the details thereof, they are on the whole substantially identical in overall configuration. Each of the traces 32 and 34 contains a first portion 32A and 34A of relatively short length and having a relatively steep and uniformly sloping leading edge followed by a plateau. It is noted that trace section 34A differs from that of 32A in that the former is greater in magnitude and has a small peak at the end thereof. While these differences in trace sections 34A and 34B are acknowledged, they do not significantly detract from the overall similarity in the envelops of the two traces 32 and 34.

Upon further analysis of traces 32 and 34 it is noted each of the traces has a second section 32B and 34B of intermediate length. Sections 32B and 34B, like sections 32A and 34A have marked similarities. For example, each of the sections 32B and 34B are characterized by a gradual increase in slope with two intermediate dips, one located very near the beginning of the section and the other at the approximate midpoint. Of course, certain dissimilarities exist, such as, the absence of a peak at the end of trace 34B which is found in trace 32B and the difference in the amplitude of the first peak of trace second 32B relative to the first peak of section 34B. Again, while the dissimilarities are acknowledged they do not detract from the overall similarity of the two traces 32 and 34.

Further analysis of traces 32 and 34 reveals a third section 32C and 34C of relatively extended length. Except for identical large dips found in each of the sections 32C and 34C, the sections are characterized by a generally increasing slope with a slight peak at the end. In each case the gradually increasing slope portion following the rather substantial dip is divided into two sections, the second of which is both shorter in length and larger in magnitude than the first. Again, close analysis of the sections 32C and 34C will reveal certain disparities in the details of the traces, but it is believed that they do not seriously detract from the overall similarity of the envelops of traces 32 and 34.

Finally, analysis of the traces 32 and 34 indicates that they both terminate in peak section 32D and 34D. While the peaks differ in amplitude, they are substantially identical in length and, in conjunction with the entire trace, lend uniqueness thereto.

The foregoing analysis of the traces of force versus time of Charles B. Boenning, produced as an incident to the signature writing operation, demonstrates the reproducible nature of the force variation characteristic inherent in the writing process of a predetermined person signing his name. In addition to the reproducible nature of the pressure variation pattern of a given person, which is a definite requirement for a feasible identification system, the pressure variation characteristic must also be unique for each individual. This latter criterion, namely, uniqueness, is clearly demonstrated by comparing the traces 32 and 34 of FIGS. 2 and 3 produced by Charles B. Boenning with the traces 38 and 40 of FIGS. 4 and 5 produced by one James E. Paulus. The traces 38 and 40 produced by James E. Paulus differ markedly from the Boenning traces 32 and 34 in a number of respects. For example, in the Paulus traces 38 and 40, while there are four sections 38A–38D and 40A–40D, their final sections 38D and 40D are not short length peaks, such as their counterparts 32D and 34D of the Boenning traces 32 and 34, depicted in FIGS. 2 and 3, but rather are sections of substantial length. Additionally, each of the third of four sections of the Paulus traces, namely, sections 38C and 40C, are markedly different from their counterpart trace sections 32C and 34C of the Boenning traces 32 and 34 in that the Paulus traces are substantially shorter than the extended length sections of the Boenning traces.

Thus, it is apparent that in addition to an individual's force variation pattern being reproducible, as indicated by the similar Boenning traces of FIGS. 2 and 3 and the similar Paulus traces of FIGS. 4 and 5, the force variation pattern differs markedly from individual to individual, as shown by the comparison between the Boenning traces of FIGS. 2 and 3 and the Paulus traces of 4 and 5. Accordingly, the force variation pattern is deemed a useful identifying characteristic for personal identification purpose.

The traces 42 and 44 of FIGS. 6 and 7 constitute force versus time plots produced by a skilled commercial artist in the act of forging the signatures of Charles B. Boenning and James E. Paulus, respectively. The forgeries 43 and 45 were produced by actually tracing authentic signatures 33, 35 and 39, 41 of the respective persons. Comparison of the forged signatures 43 and 45 produced by the commercial artist with authentic signatures 33, 35 and 39, 41 of the respective individuals shows that they are excellent forgeries and would in all probability not be detected as such except by the most skilled handwriting expert.

Notwithstanding the marked similarity between the forged signatures 43 and 45 and the authentic signatures 33, 35 and 39, 41, traces 42 and 44 produced by the commercial artist are substantially different in overall envelop configuration from the authentic Boenning traces 32 and 34 and the authentic Paulus traces 38 and 40, respectively. For example, in comparing the trace 42 produced by the commercial artist in the course of forging the signature of Charles B. Boenning with the authentic Boenning traces 32 and 34, it is noted that the trace 42 has five separate sections 42A–42E in contrast to four sections 32A–32D and 34A–34D in each of the authentic Boenning traces 32 and 34. Additionally, the first section 42A of the trace 42 has three distinctive peaks which are not present in the counterpart authentic trace sections 32A and 34A. Also, trace sections 42B, 42C and 42D are each characterized by a generally erratically varying amplitude, whereas the counterpart sections 32B, 32C and 34B, 34C of genuine traces 32 and 34, respectively, are not so characterized. Further analysis of the specious trace 42 with respect to the authentic Boenning traces 32 and 34 reveals other differences. For example a striking difference is the overall length of the specious trace 42 relative to the authentic traces 32 and 34, the specious trace being approximately twice the length of the authentic traces 32 and 34.

Further demonstrating the differences between authentic traces and those obtained by a skillful forger, reference is made to FIGS. 4 and 5 which depict authentic Paulus traces 38 and 40 and FIG. 7 which depicts the specious Paulus trace 44. In comparing the forged trace 44 with authentic traces 38 and 40, it is noted that the first section 44A of the forged trace 44 has two separate and distinct peaks, the latter peak of which is significantly higher than the former peak. This dual peak configuration of section 44A of forged Paulus trace 44 is not found in counterpart sections 38A and 40A of the authentic Paulus traces 38 and 40. Also, the latter portion of trace section 44B of the forge trace 44 is characterized by having two distinct peaks, the latter peak of which is substantially larger in magnitude. This dual peak configuration at the end of section 44B of the forged trace 44 is not found in counterpart sections 38B and 40B of the authentic Paulus traces 38 and 40. It is further noted that the third section 44C of the forged trace 44 is characterized by having five separate and distinct peaks in contract to four separate and distinct peaks in each of the counterpart sections 38C and 40C of the authentic Paulus traces 38 and 40. In comparing the forged and authentic traces it is also noted that the fourth section 44D of the forged trace 44 has an erratically varying amplitude characteristic with three distinct peaks at its end region. The counterpart sections 38D and 40D of the authentic Paulus traces 38 and 40 are not so characterized. Finally, the overall length of the forged trace 44 is approximately twice that of the authentic traces 38 and 40.

A writing instrument suitable for carrying out the invention is depicted in FIG. 8. The writing instrument 10 includes a generally tubular casing 50 having a standard ballpoint pen cartridges 52 slideably disposed in a bore 54. A guide bushing 56 is pressed into the outer end of the bore 54 and has a bore 58 therein which guides the reduced diameter cartridge section 60 containing the pen point 62. A coil spring 64 surrounding the reduced diameter portion 60 of the pen cartridge 52 and located between the inner end of the guide bushing 56 and a shoulder 66 of the cartridge 52 urges the cartridge 52, including the point 62, rearwardly, causing the end of the cartridge to abut a brass plug 76 to be described.

The writing instrument or pen 10 further includes a transducing section 68. The transducing section 68 includes a differential transformer 70 having a movable core 72, to be described in more detail hereafter. The movable core 72 which is axially disposed relative to the writing instrument 10, is connected via link 74 to the brass plug 76. Plug 76 is slideably mounted in the bore section 78 of the pen 10 between a spacer washer 80 and a sleeve 82. The differential transformer 70 is fixed in a cavity in sleeve 82 by a shaft 84 connected at one end to the differential transformer and at the other end to a nut 86. Nut 86, when tightened, locks the differential transformer 70 relative to the sleeve 82.

To permit axial adjustment of the differential transformer 70 relative to the pen casing 50 a knurled cap 88 is provided. The cap 88 threadedly engages the periphery of the tube 50, as well as the periphery of the sleeve 82. The threads 90 and 92 differ in number of threads per inch. Accordingly, when the cap 88 is advanced or retracted relative to the tubular case 50, the sleeve 82 and hence the differential transformer 70 is advanced or retracted.

In operation when the writing instrument 10 is engaged by the hand of the user to produce a signature, such as the signature 14 shown in FIG. 1, the force between the writing surface 12 and the writing instrument 10 is transmitted to the pen point 62, urging the cartridge 52 rearwardly relatively to the hand-held tubular pen case 50. Movement of the cartridge 52, in response to the force encountered during the signature writing operation, is transmitted to the movable core 72 via the axially movable plug 76 and link 74. Movement of the core 72, in the manner to be described hereafter, provides an electrical time-varying output correlated to the time-varying force between the pen 10 and writing surface 12 produced as a consequence of writing the signature.

With reference to FIG. 9, a preferred form of signal processing circuit 16 and strip-chart recorder 20 is depicted. The signal processing circuit 16 includes a 5000 hertz signal generator 100, the output of which is applied across the primary winding 102 of the differential transformer 70. A resistor 104 is connected across the entire secondary winding 106 of the differential transformer 70 via similarly poled diodes 110 and 112, with the center tap 113 of the secondary winding connected to the midpoint of the resistor 104. A smoothing capacitor 114 is connected in parallel with the resistor 104.

In operation, by virtue of the manner in which the secondary winding 106 is wound, namely, in two equal sections 106A and 106B wound in series opposition, the ends of winding 106 are opposite in polarity, as indicated by the dots, producing across the resistor 104 zero voltage when core 72 is centered with respect to the tap point 113 of the secondary winding 106. When the core 72 is moved off-center, the two series opposition one-half sections 106A and 106B of the secondary winding 106 are differentially coupled with the primary winding 102, providing an output across capacitor 114 proportional to the displacement of the core 72 from the centered position. The output voltage across the capacitor 114 is input to a preamplifier 116. The output of the preamplifier 116, in turn, is into the strip-chart recorder 20.

A differential transformer suitable for use with the writing instrument depicted in FIG. 8 is manufactured by Pickering, Incorporated, designated Model 7067D. A preamplifier and strip-chart recorder suitable for use with the invention is marked by Techni-Rite Electronics, Incorporated, Warwich, R.I., and, respectively designated Models TPA–50 and TR722

A number of modifications and refinements can be made to the invention as disclosed herein and described thus far without departing from the spirit or scope thereof. For example, in connection with FIG. 1, the comparison between the authentic trace 28 of the person of known identity and the trace 22 produced by the person desiring authentication was made by a human being, for example, a bank teller or department store clerk extending credit in a consumer sales transaction. Comparison may also be effected in a number of other well known ways. For example, conventional optical comparison techniques may be employed. One such technique is depicted in FIG. 10. In accordance with this technique, the stored trace 120 generated by person of known identity is in the form of a photographic negative 124. In such form, the trace 120 appears transparent while the background 122 of the negative 124 appears opaque. The trace generated at the time of authentication by the person for whom identification is desired is in the form of a photographic positive 125, with the trace 126 appearing opaque and the background 128 appearing transparent. Comparison is effected by superimposing the positive 125 and the negative 124, and placing the superimposed records between a source of light such as an incandescent lamp 130, and a phototransducer 132. If the trace 126 generated at the time of authentication is identical or substantially identical to the authentice trace 120, little or no light from the lamp 130 is transmitted by the superimposed positive and negative 126 and 124 to the phototransducer 132, providing no signal on phototransducer output line 134 to an indicator 136. Alternatively, if the traces 126 and 120 are not identical, the opaque trace 126 will not substantially overlie the transparent trace 120, enabling light from the lamp 130 to strike the phototransducer 132 and produce an output on line 134 to the indicator 136, causing a suitable indication to be provided.

In addition to human comparison and optical comparison techniques, well known analogue signal comparison techniques may be employed. For example, the authentic force trace generated by a person of known identity while writing his signature may be recorded on magnetic tape in the form of a time-varying signal, and this authentic time-varying recorded signal replayed concurrently with the generation of the new time-varying signal at the time of authentication. The replayed, stored, time-varying signal which is authentic, can then be subtracted by well known analogue subtraction techniques from the time-varying signal generated at the time of authentication. If the subtraction produces a remainder of insignificant magnitude, then the signal generated at the time of authentication is deemed to be the same as the authentic signal which is stored, and the person for which authentication is sought deemed to be authentic. The magnetic tape on which is stored the authentic signal for comparison may form a portion of a large selectively addressable central storage device in which is stored numerous such authentic signals, or may comprise a personal identification card carried by the party seeking identification such as the bank patron or department store charge customer.

To avoid complications introduced by the need for scaling the independent variable of the force versus time plot, namely, time, which becomes desirable when the stored representation of the force trace is on a time scale different from that generated at the time of authentication, a discontinuous time scale defined as followed may be used. The independent variable, namely, the force, is digitized, providing a sequence of digital values or levels corresponding to the magnitude of the force at different points. Once this is done, the resulting sequence of digital levels can be used as representative of the force variation, ignoring the duration of each level. Thus, instead of storing an analogue signal or a visual perceptive trace of the force variation as a function of time, a sequence of digital levels is stored. At the time of authentication, this stored sequence of authentic digital levels previously generated by a person of known identity is compared with a sequence of digital levels similarly generated at the time of authentication. The comparison of the authentic sequence of digital levels with the sequence generated at the time of authentication can be done in a number of ways. For example, corresponding digital levels of each sequence may be subtracted from each other and the sum of the absolute values of the individual level subtraction operations added to determine the degree to which the sequences of levels differ, and hence the degree of mismatch between the force variation of the authentic signature and that of the signature to be authenticated.

While the force transducer disclosed herein has been in the form of a differential transformer with movable core, other force transducers can be used. For example the force between the writing instrument 10 and the writing surface 12 can be used to vary the inter-plate distance between a pair of capacitator plates, and this variation in turn sensed in well known ways as a variation in capacitance. Alternatively, a strain gage can be utilized. The force between the writing instrument 10 and the writing surface 12 can also be hydraulically coupled to a pressure detecting unit separately mounted. Piezoelectric materials, as well as pressure sensitive paints whose resistance varies as the function of pressure, can similarly be used to transduce the time-varying force generated during the signature writing operation.

The invention has been described with respect to monitoring the force between a pen and writing surface. However, because of the known relationship between force and pressure, namely, $F=PA$, where F is force, P is pressure, and A is area, it will be obvious to one skilled in the art that variations in pressure can be utilized as well.

Finally, while the invention has been described with respect to verifying the identity of a person for the purpose of a credit transaction, it will be obvious to those skilled in the art that the identification system of this invention has other utility. For example, the identification system of this invention can be utilized in security systems wherein it is desired to verify the identity of unknown persons seeking entrance into a restricted area before allowing them to enter. In accordance with such an arrangement, the person of unknown identity, prior to entering the restricted area through an appropriate gate, signs his name. The force trace produced as a consequence of this signature writing process is then compared with a stored force trace generated by a person of known identity for which entry into the restricted area is permissible, made while that person signed his name. If a favorable comparison results, the person seeking entrance through the gate is admitted to the restricted area.

Having described the invention, what is claimed is:

1. A system for identifying a person comprising:
   a writing instrument,
   a writing surface,
   a transducer operatively associated with at least one of said instrument and surface for producing a time-varying signal correlated to the time-varying force existing between said instrument and surface when a person to be identified writes a predetermined character sequence,
   recording means responsive to said signal for producing a visually perceptive trace correlated to the force as a function of time generated when said person to be identified writes said predetermined character sequence,
   storage means for storing a second visually perceptive trace correlated to the force as a function of time generated by a person of known identity writing said sequence of characters,
   comparison means for optically comparing said visually perceptive traces to determine the identity of said person to be authenticated, and
   indicator means responsive to said comparison means for providing an indication respecting said comparison.

References Cited

UNITED STATES PATENTS

| | | | |
|---|---|---|---|
| 3,528,295 | 9/1970 | Johnson et al. | 73—432 |
| 2,091,060 | 8/1937 | Watson | 33—18 |
| 1,642,369 | 9/1927 | Hendickson | 33—18 B |
| 1,883,204 | 10/1932 | Whitaker | 33—18 B |
| 2,077,237 | 4/1937 | Hein | 356—71 |
| 3,029,526 | 4/1962 | Olalainty | 35—22 |
| 3,113,461 | 12/1963 | Peters | 73—432 |

OTHER REFERENCES

A. S. Osborn, Questioned Documents, The Lawyers Cooperative Publishing Co., Rochester, N.Y., 1910 (pages 19, 111, and 132 to 140 relied upon).

S. CLEMENT SWISHER, Primary Examiner